United States Patent [19]

Ahlen et al.

[11] 4,347,044
[45] Aug. 31, 1982

[54] PUMPS

[75] Inventors: Karl G. Ahlen, Bromma; Nils A. Norberg, Stockholm, both of Sweden

[73] Assignee: S.R.M. Hydromekanik Aktiebolag, Sweden

[21] Appl. No.: 66,536

[22] Filed: Aug. 15, 1979

[30] Foreign Application Priority Data

Aug. 18, 1978 [GB] United Kingdom .............. 33809/78
Nov. 21, 1978 [GB] United Kingdom .............. 45432/78
Dec. 20, 1978 [DE] Fed. Rep. of Germany ....... 2855085

[51] Int. Cl.³ ............................................. F04B 49/00
[52] U.S. Cl. ...................................... 417/253; 60/486; 74/688; 417/286; 417/310; 417/440; 418/9; 418/200
[58] Field of Search ................................ 417/286–288, 417/216, 307, 310, 440, 297, 253, 244, 62; 74/687, 688, 868; 60/428, 486; 418/9, 10, 200

[56] References Cited

U.S. PATENT DOCUMENTS

| | | | |
|---|---|---|---|
| 1,843,246 | 2/1932 | Sloane | 418/9 |
| 3,021,790 | 2/1962 | Brunson | 417/310 X |
| 3,381,891 | 5/1968 | Bellmer | 417/62 |
| 3,412,685 | 11/1968 | Connelly | 417/440 |
| 3,431,856 | 3/1969 | Whitmore et al. | 417/216 |
| 3,526,468 | 9/1970 | Moon et al. | 417/216 X |
| 3,850,549 | 11/1974 | Hansen | 417/310 |
| 3,985,472 | 10/1976 | Virtue et al. | 417/216 |
| 4,056,019 | 11/1977 | Ahlen | 74/688 X |
| 4,061,271 | 12/1977 | Kimbrough | 417/307 |
| 4,184,330 | 1/1980 | Polzer et al. | 74/688 X |
| 4,199,303 | 4/1980 | Gusmer et al. | 417/2 X |
| 4,259,045 | 3/1981 | Tenyama | 418/200 |

Primary Examiner—Carlton R. Croyle
Assistant Examiner—Edward Look
Attorney, Agent, or Firm—Larson & Taylor

[57] ABSTRACT

A fluid system, especially for a transmission having a hydrodynamic torque converter and a mechanical change speed gear box downstream therefrom. For supplying pressurized fluid to the working chamber of the torque converter, the clutches and brakes of the torque converter and the servomotors which control the gear steps of the downstream mechanical change speed gear box, there is provided a pressure system having first and second low pressure pumps and preferably an auxiliary high pressure pump. The first low pressure pump delivers fluid continuously for delivery to the working chamber of the torque converter and to the servomotors. The second low pressure pump can deliver pressurized fluid through a one way valve to the discharge side of the first low pressure pump or alternatively its output can be bypassed directly to the input of the second low pressure pump. The second low pressure pump provides fluid to the inlet side of the high pressure pump and the high pressure pump delivers high pressure fluid to the servo motors as needed. The three pumps and the passages connecting the same may all be located in a common housing which may be formed as a part of the transmission.

30 Claims, 9 Drawing Figures

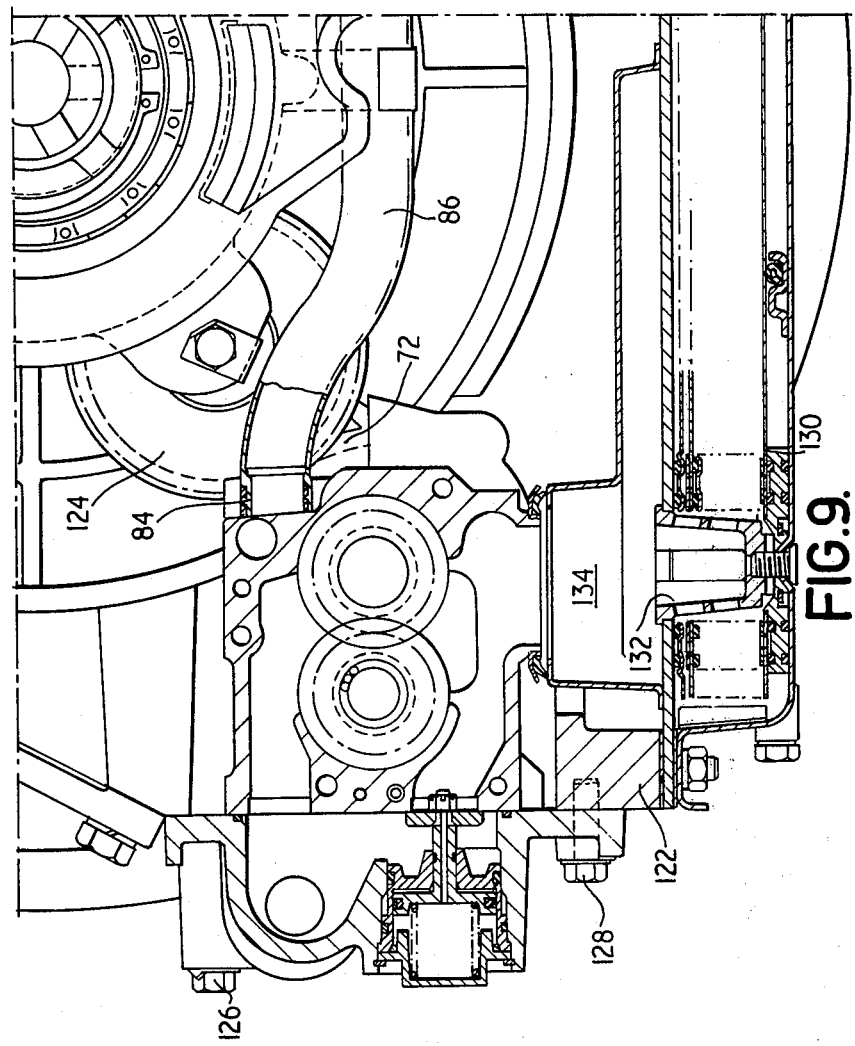

PUMPS

This invention relates to a pump aggregate arrangement for supplying fluid under pressure. In particular the invention relates to a pump aggregate arrangement for supplying pressurised fluid to the working chamber of a hydrodynamic torque converter and/or the servomotors of the clutches and brakes in a change-speed gearbox of a motor vehicle drive including a low pressure fluid pump constructed as a gear pump.

Low pressure fluid pumps in the form of gear pumps are generally known in motor vehicle drives. In the case of hydrodynamic torque converters, they serve as so-called feeder fluid pumps for the torque converter working chamber, in order to maintain the necessary basic pressure therein and at the same time through an external circulation of fluid through a heat exchanger (radiator) to compensate for any heat generation in the converter working chamber. In many cases, a reversal of the direction of the external fluid circulation and thus the interchange of the inlet and outlet position at the converter working chamber will be utilised in order to disengage the pump or turbine wheel of the converter and in its place to operate a friction clutch to bridge the converter.

In the case of mechanical change-speed gear mechanisms particularly epicyclic gears, such low pressure pumps are required to supply the operating fluid for the servomotors of the friction clutches and brakes which shift the individual gears.

In addition, such low pressure pumps are frequently required to perform the additional function of providing for lubrication of the mechanically rotating parts of the transmission.

Demands both on efficiency of the hydrodynamic torque converters and also the power transmitting and shifting capacity of the mechanical change-speed gear mechanism in motor vehicle drives, particularly those which are automatically controlled, are rising continuously. Currently, torque converters are expected to provide considerable torque multiplication during starting and moving off from standstill. Further, braking facilities are often required on downhill stretches, to provide hydraulic braking. This necessitates a corresponding capacity of the converter feeder fluid pump.

Mechanical change-speed gear mechanisms, particularly such which are preceded by a torque converter, are required, by means of friction clutches and brakes, to absorb ever greater levels of torque an for this purpose they require correspondingly strong servomotors, for the rapid filling of which large quantities of pressurised fluid have to be available for short duration when gears are shifted.

On the other hand, the quantity of pressurised fluid required during normal operation, particularly on long distance runs, is comparatively small and a low pressure pump which is designed for the large rates of delivery required for short duration does have quite a considerably adverse effect on the efficiency of the vehicle drive.

The development of mechanical and hydromechanical vehicle transmissions present many problems which have not yet been satisfactorily solved. The problems include problems associated with cooling, shaft time, efficiency, especially in high gear and problems for modulating fluid pressure for controlling actuation of servo-motors which, in turn, control operation of the transmission during different driving and braking conditions.

Further problems which need to be solved include reducing unwanted variation of oil pressures at different input speed and input speed ratios and driving conditons, e.g. hydraulic drive and direct drive. In solving such problems it is desirable to achieve conditions where the oil pressure can be kept at a desired level saving not only energy but also reducing wear and reducing stresses, etc.

It is therefore the aim of the present invention to solve the above problems by providing a pump aggregate arrangement which can be automatically controlled to provide circulation quantities according to demand and thereby influence also pressure levels and demand for sizes of maximum pressure valves, and allows reduciton of the cross-sectional areas in fluid passages for circulation of the fluid through the torque converter system.

The present invention will also contribute to the possibility of reducing clutch/brake friction surfaces due to the fact that shift time and shift operations are more adequately controlled. Further, the invention seeks to solve the problem of providing a pump aggregate arrangement of the type mentioned above, and with which it is possible immediately to supply quantities of fluid which are greater than those required during normal running, without this having any such adverse effect on the efficiency.

According to the invention, this problem is resolved by utilising a second low pressure fluid pump, from which pressurised fluid can be supplied via a non-return valve to the pressure side of a first low pressure fluid pump when the outlet pressure of the second low pressure fluid pump is higher than that of the first low pressure fluid pump; and including a by-pass valve located between the pressure side and the intake side of the second low pressure pump in a connecting channel which includes a shut-off valve which can be actuated by a servomotor.

The shut-off valve of the pump arrangement according to the invention can easily be controlled by currently available control means, particularly in the case of so-called automatic gearboxes, to ensure that the shut-off valve closes when a larger quantity of fluid is required than is supplied by the first low pressure fluid pump which constantly supplies pressurised fluid. In all other operating situations, the second low pressure fluid pump is short-circuited by the open shut-off valve in the communicating passage and absorbs virtually no power, the non-return valve preventing pressurised fluid supplied by the first low pressure fluid pump flowing back to the intake side of the pumps.

To this end, in order to minimise as far as possible the resistance to flow via the shut-off by-pass valve, the shut-off valve is in a further advantageous development of the invention a disc valve which closes in the direction of flow. This at the same time ensures that the delivery fluid pressure of the pump cannot force open the valve which should be in its closed position. In order nevertheless to achieve reliable opening, actuation of the shut-off valve is in a further development of the invention so constructed that the valve can be opened by the servomotor against the force of a closing spring.

A further feature aimed at minimising resistance to flow resides in that the communication passage of a cross-section which is equal to or greater than the delivery cross-section of the second low pressure fluid pump and extends directly alongside this latter.

The first low pressure fluid pump should have a capacity corresponding to the fluid requirement of the torque converter after reaching a speed ratio of approx. 0.2 between output shaft and input shaft. The capacity of the second low pressure fluid pump should be at least as great and may be up to three more times the capacity of the first low pressure fluid pump. In this way, it can be ensured that with the shut-off valve open, at speed ratios between output and input shafts of the torque converter of less than 0.2 and during converter braking and, furthermore, during changes of gear in the change-speed gear mechanism a sufficiently large quantity of fluid is available on the one hand to dissipate the necessary heat loss and on the other hand to rapidly fill the servomotors of the transmission.

In order to produce a particularly high holding pressure in the servomotors of motor transmissions, it is also already known to use an auxiliary high pressure fluid pump which increases the torque absorption capacity of the friction clutches and brakes particularly during starting up and moving off. During normal driving, however, such a high actuating pressure of the servomotors is not required, so that the high pressure produced by the high pressure fluid pump constitutes an unnecessary loading on the seals in the fluid lines and passages and the servomotors, leading to leakages and power losses.

This disadvantage of high pressure fluid pumps in the known pump arrangements is, as an advantageous further development of the invention, obviated in that the high pressure fluid pump is fed by the second low pressure fluid pump. Under normal operating conditions, the intake pressure and thus also the final pressure of the high pressure fluid pump is substantially lower than in the case of the known arrangements with the high pressure fluid pump inlet at the full low pressure level, and yet the high pressure fluid pump generates a holding pressure which is adequate for these cases.

In order to ensure that when the shut-off valve is open the high pressure pump actually does supply a lower holding pressure than when the valve is closed, it expediently has a pressure limiting valve to connect its discharge side to the discharge side of the second low pressure fluid pump.

Finally, a particular feature in the development of the invention provides for the non-return valve also to be a plate valve in order to achieve the largest possible opening cross-section for the pressurised fluid delivered by the second low pressure fluid pump.

The invention will now be described by way of example with reference to the accompanying drawings, in which FIG. 1 shows a hydraulic and electrical circuit diagram of an automatically controlled hydrodynamic-mechanical combined transmission consisting of a hydraulic torque converter, having a double rotatin guide wheel and a change-speed gear mechanism which can be shifted under load and which is constituted by two serially disposed epicyclic gearings, with eight forward and two reverse gears, for a motor vehicle:

FIG. 9 shows on a smaller scale, a cross-section through a part of the fixed housing of a hydrodynamic-mechanical transmission with the pump block provided therein.

Figure 1:
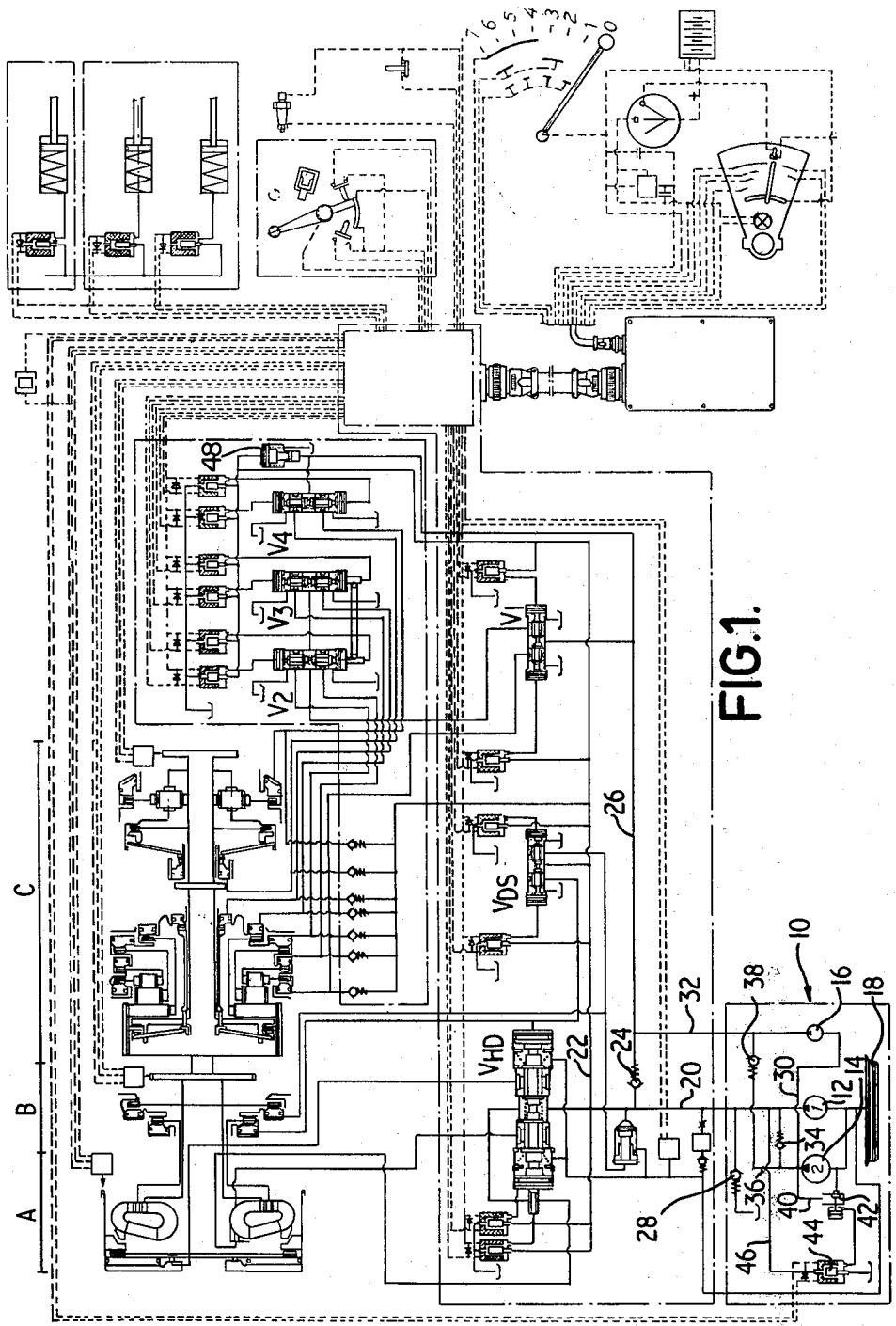
Figure 2:
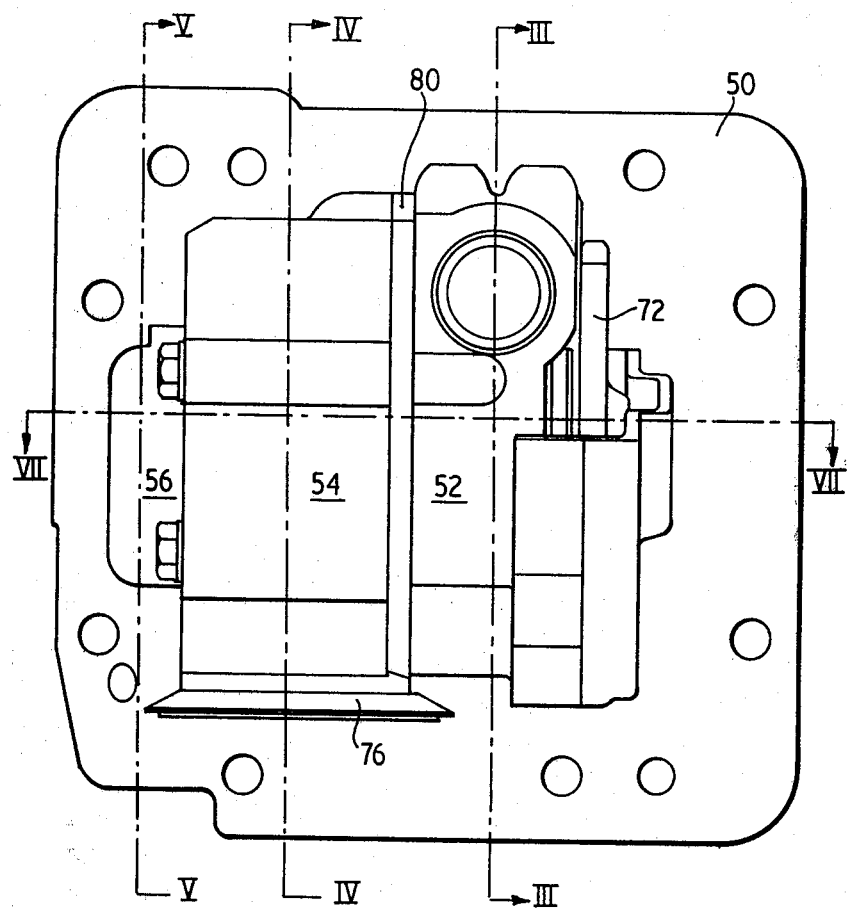
FIG. 2 is a view of a pump housed within a casing for mounting on the housing of the hydraulic torque converter.

In FIG. 1, in the top left-hand corner, there is shown a hydrodynamic-mechanical combined gear mechanism consisting of a hydraulic torque converter A, a section B having servomotors for controlling a double rotation section of the converter for optional engagement of the converter guide wheel in opposition to the turbine wheel or for braking the converter guide wheel at the fixed transmission housing and a change-speed gear mechanism C which can be shifted under load. The change-speed gear mechanism C for its part is composed of a first epicyclic gearing with four forward gears—including a direct gear—and a reverse gear and a second epicyclic gearing with direct gear or greatly reduced gear, so that by means of the second epicyclic gearing, the four forward gears and the reverse gear of the first epicyclic gearing can be so duplicated that there are in addition four greatly stepped-down forward gears and one greatly stepped-down further reverse gear.

The hydraulic torque converter A is furthermore provided with a direct drive clutch, upon engagement of which the hydraulic torque converter becomes inoperative.

In order to switch over the torque converter from hydraulic drive to direct drive, a 5/3-way valve $V_{HD}$ is provided which, with regard to the considerable quantity of fluid to be supplied by the converter chamber under certain conditions of operation, is of relatively large construction.

In order to switch over the converter guide wheel from double rotation (rotation in opposition to the turbine wheel) to single rotation (fixed braking of the guide wheel), there is a substantially smaller 5/3-way valve $V_{DS}$.

A further 5/3-way valve $V_1$ of more or less the same size as the valve $V_{DS}$, is associated with the change-speed gear mechanism C and serves for switching between forward travel and reverse travel. When the valve $V_1$ is set for reverse travel, hydraulic control fluid is fed directly to the actuating servo of a corresponding brake in the first epicyclic gearing of the gearbox C. When positioned for forward travel, the hydraulic fluid is passed by the valve $V_1$ to two further 5/3-way valves $V_2$ and $V_3$ which are mechanically interlocked in respect of each other and control the supply of pressurised fluid to the servomotors of three forwards brakes and to a direct drive clutch which is part of the first epicyclic gearing.

Finally, there is a further 5/3-way valve $V_4$ which is supplied with pressurised fluid directly, by-passing the valve $v_1$, and which serves to control the actuating servo for the second epicyclic gearing of part C in order to cut in pronounced reduction or direct drive.

The aforedescribed valves and the consumer units connected to them are supplied by a source of pressurised fluid designated generally 10 in FIG. 1. The pressurised fluid source 10 consists of two low pressure pumps 12, 14 and a high pressure pump 16. The two low pressure pumps 12, 14 draw the pressurised fluid such as particularly oil from a pump 18 preferably disposed in the transmission housing of the combined gear mechanism and possibly containing a heat exchanger.

The low pressure pump 12 feeds the drawn-in pressurised fluid through a line 20 constantly to the inlet chamber of the valve $V_{HD}$, from which, in both positions of engagement, it is passed on to the working chamber of the hydraulic torque converter and hence, via this valve, back to the pump sump, wher it can be cooled in the heat exchanger. According to the direction in which the fluid passes through the converter chamber, so the revolving converter housing which forms the input member is coupled either to the pump wheel of the converter to produce hydraulic drive or to the turbine shaft to produce direct drive.

Branching from the line 20 is a line 22 through which the liquid delivered by the low pressure pump 12 can also be constantly fed to the inlet chamber of the control valve $V_{DS}$ for controlling the double rotation of the converter. Furthermore, the line 22 carries the pressurised fluid delivered by the low pressure pump 12 to all electromagnetic preliminary valves of the aforementioned control valves to operate them when the preliminary valves are electrically actuated.

A line 26 branching from the line 20 via a non-return valve 24 leads to the inlet chamber of the 5/3-way valve $V_1$ which switches between forward gear and reverse gear and, parallel therewith, to the inlet chamber of the control valve $V_4$ for the second epicyclic gearing, which is thus supplied with pressurised fluid independently of the valve $V_1$. Finally, a pressure limiting valve 28 is connected to the line 20 and opens when there is excessively high pressure in the line 20 to the sump 18, so limiting the pressure in the line 20.

The second low pressure pump 14 which, when the drive unit is running, is driven together with the first low pressure pump 12 constantly by the revolving converting housing, draws fluid from the sump 18 and passes it at low pressure through a line 30 to the intake side of the high pressure pump 16, the discharge side of which is connected via a line 32 to the line 26 after the non-return valve 24.

The discharge side of the second low pressure pump 14 is furthermore, via a non-return valve 34, connected to the discharge side of the first low pressure pump 12 and can therefore, in addition to this pump, pass pressurised fluid into the line 20 when the pressure present therein is lower than the output pressure of the second low pressure pump 14.

A line 36 leads from the pump line 16 via a pressure limiting valve 38 back to the discharge side of the second low pressure pump 14 and limits the outlet pressure of the high pressure pump 16 compared with the outlet pressure of the second low pressure pump 14.

Finally, from the outlet side of the second low pressure pump 14, a line 40 with a by-pass valve 42 leads back to the intake side of this pump. The by-pass valve 42 can be controlled by an electromagnetic preliminary valve 44 to which control pressure is supplied via a line 46 from the line 20.

From the pressurised fluid source 10, therefore, two pressurised fluid lines emerge, in fact one low pressure line 20 and one high pressure line 32, from which branch lines 22 and 26 respectively (inter alia) to the valves $V_2$, $V_3$ and $V_4$, where a pressure limiting valve 48 ensures that the pressure between these two lines does not exceed a definite value and thus ensures that for opening of the valves $V_1$-$V_4$ which are constructed as plate valves the actuating pressure controlled by the preliminary valve is sufficient to raise the valve plates against the pressure prevailing in the high pressure line 26.

As the ensuing description of FIGS. 2 to 8 shows, the pumps 12, 14, 16, the non-return valve 34, the pressure limiting valves 28, 38 and the by-pass valve 42 are combined with the preliminary valve 44 into one structural unit in the form of a valve block.

The valve block has a baseplate 50 with a multi-part housing which accommodates the first low pressure pump 12 in one housing part 52, the second low pressure pump 14 in a further housing part 54, and the high pressure pump 16 in a housing part 56.

Figure 3:
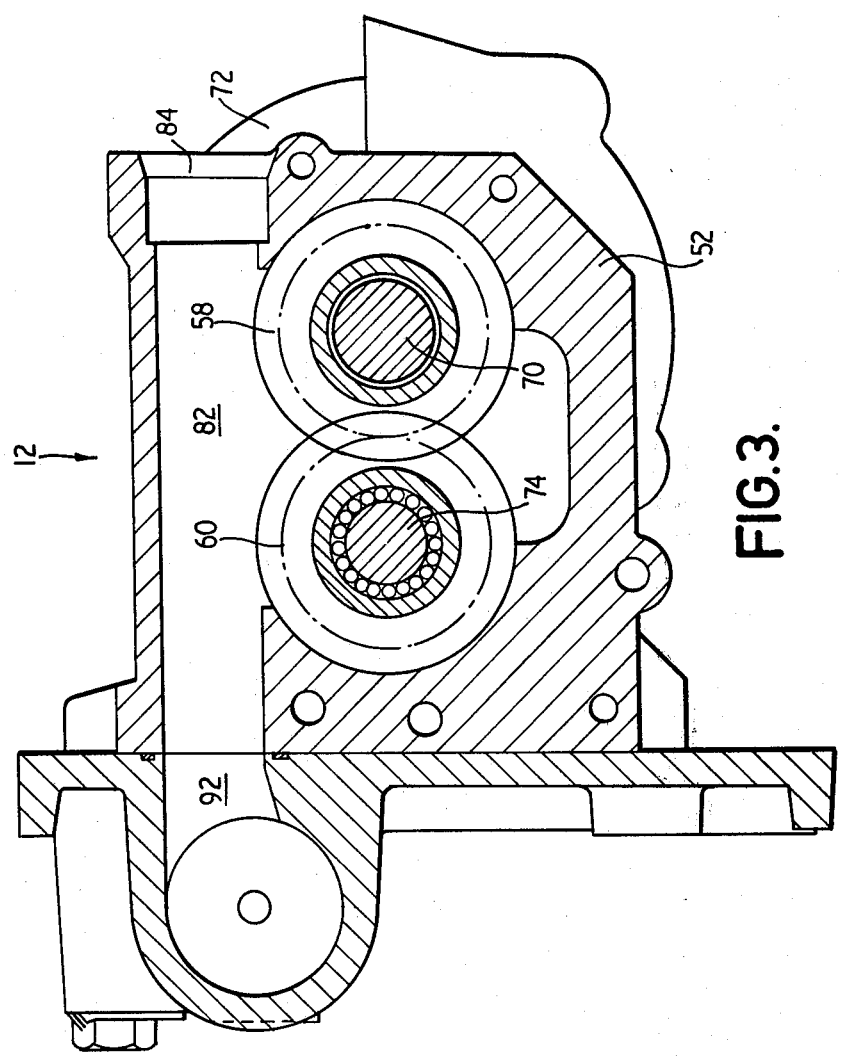
FIG. 3 is a vertical cross-section through the first low pressure pump of the pump set, taken on the line III—III in FIG. 2.
Figure 4:
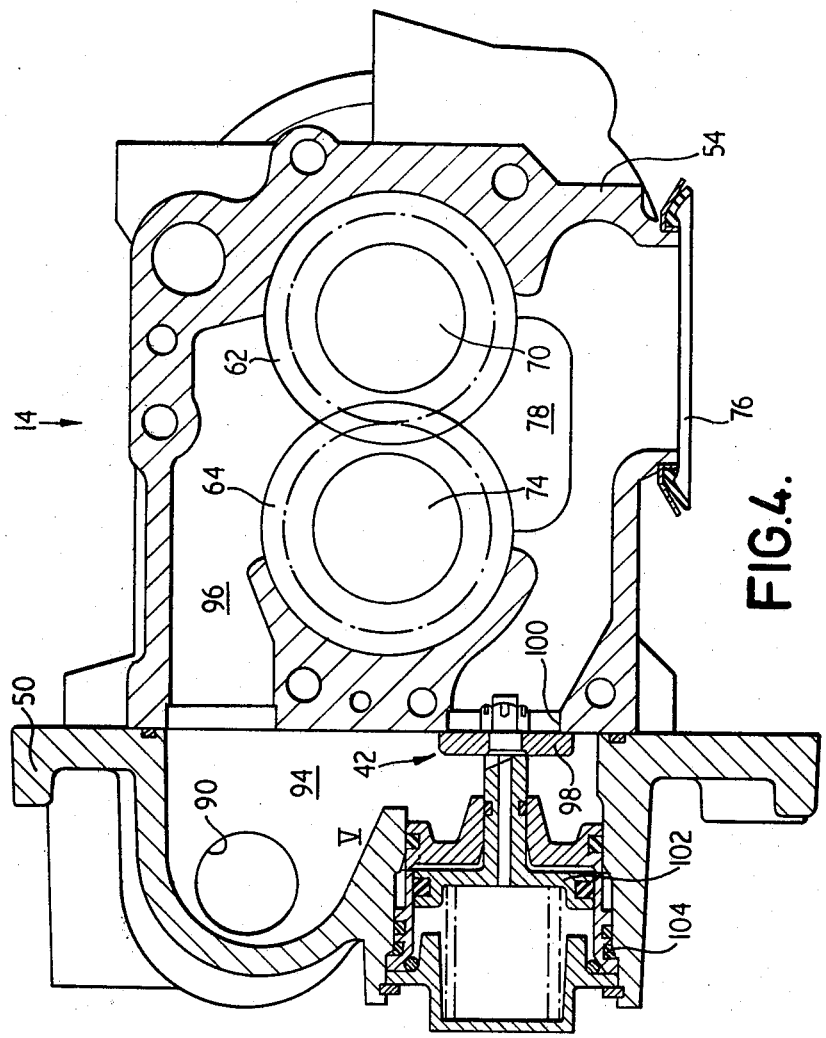
FIG. 4 is a cross-section through the second low pressure pump of the pump set, taken on the line IV—IV in FIG. 2.
Figure 5:
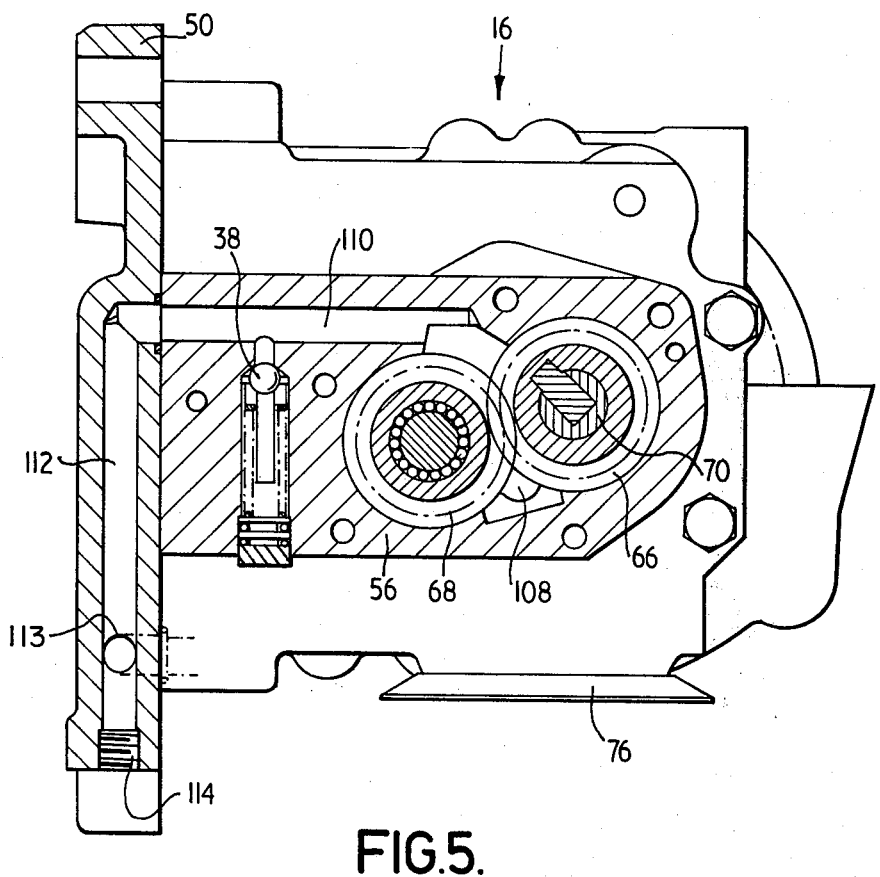
FIG. 5 is a cross-section through the high pressure pump of the pump set, taken on the line V—V in FIG. 2.

As FIGS. 3, 4 and 5 show, the three pumps 12, 14, 16 are constructed as gear pumps with pairs of gears 58/60, 62/64, and 66/68 the gears 58, 62, 66 being mounted on a common shaft 70 and being capable of being driven via this shaft by a pinion 72.

The gears 58, 60 and 62, 64 of the two low pressure pumps 12, 14 are of the same diameter so that also the other gears 60, 64 of these two pairs of gearwheels can be mounted on a common spindle 74. The gears 62, 64 of the second low pressure pump 14 are however of a greater axial length than the gears 58,60 of the first low pressure pump 12, so that the delivery volume of the second low pressure pump is corresponding greater.

The gears 66, 68 of the high pressure pump are on the other hand of substantially smaller diameter and in their axial length they are substantially shorter than the gears of the two low pressure pumps the second gearwheel 68 of the high pressure pump being separately mounted. The delivery volume of the high pressure pump is correspondingly far less than that of the two low pressure pumps and amounts for example to 1/5th to 1/10th the delivery volume of the first low pressure pump.

The low pressure pumps 12, 14 draw the liquid which is to be delivered in through an intake connector 76 on the housing part 54 for the second low pressure pump 14. An aperture 78 in the intermediate wall 80 between the housing parts 52 and 54 establishes a connection from the intake side of the low pressure pump 14 to the intake side of the low pressure pump 12.

The low pressure pump 12 deilvers the drawn-in fluid into a pressure chamber 82 inside the housing part 52 (FIG. 3) which has an outlet 84 for the connection of a low pressure line 86 of relatively large cross-section (FIG. 9) and corresponding to the line 20 in FIG. 1.

Figure 6:
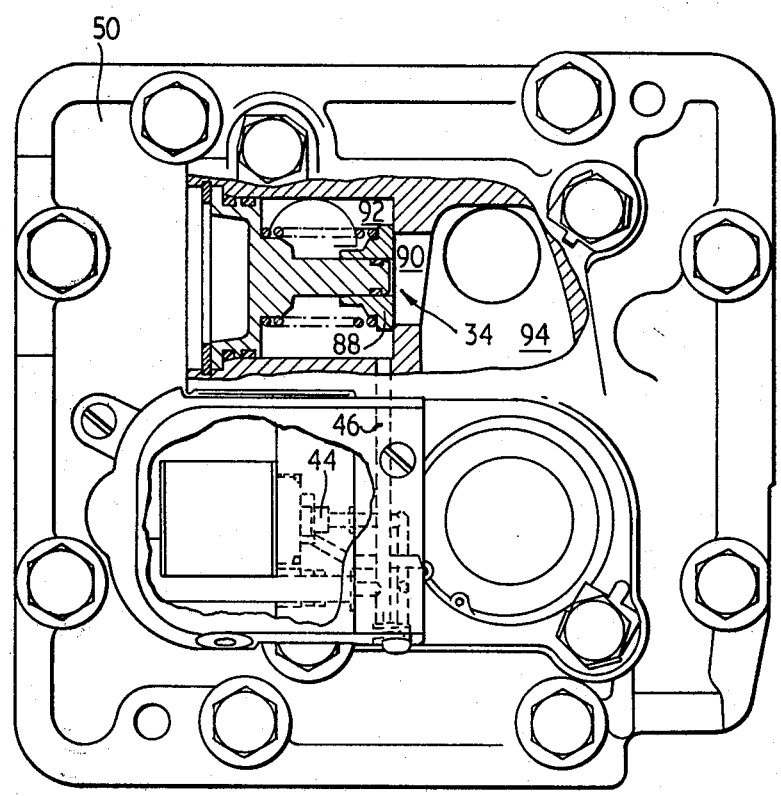
FIG. 6 shows partly in section a rear or outside view of the pump set.

As FIGS. 3, 4 and 6 show, the middle area of the baseplate 50 is constructed like a housing and in its upper part it accommodates the non-return valve 34 shown in FIG. 1 and having a spring-loaded valve plate 88 which, in its closed position, blocks a port 90 between a chamber 92 and a chamber 94.

As FIGS. 3 and 6 further show, the chamber 92 communicates with the pressure chamber 82 of the first low pressure pump 12. In a similar manner, the chamber 94 communicates with the pressure chamber 96 of the second low pressure pump. As FIG. 4 shows, the chamber 94 continues downwardly to a valve which is the by-pass valve 42 in FIG. 1. The plate 98 of this valve, in the position of closure illustrated, blocks a port 100 on the intake side of the second low pressure pump 14. A servomotor 102 serves to open the valve 42 against the force of a closing spring 104. As FIG. 6 also shows, the magnetic valve 44 for actuating the by-pass valve 42 is likewise disposed in the baseplate and is provided with control fluid via a passage contained therein and corresponding to the line 46 in FIG. 1.

Figure 7:
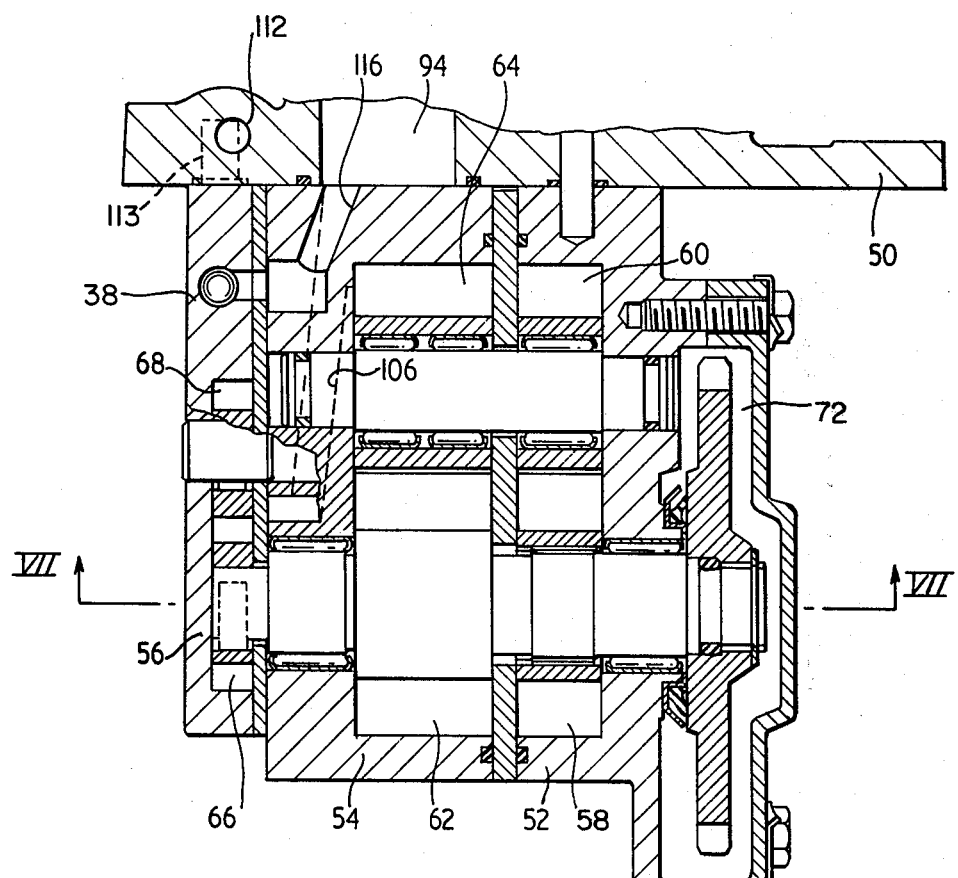
FIG. 7 is a horizontal section taken on the line VII—VII in FIG. 2.

As indicated by the broken lines in FIG. 7, a passage 106 extends from the discharge-side chamber 94 of the second low pressure pump to the intake side of the high pressure pump, which discharges into the suction chamber of this pump at 108 (FIG. 5). From the discharge side of the high pressure pump 16, a passage 110 extends in the housing part 56 to a further passage 112 in the baseplate 50, the downwardly open end of which has a screwthread 114 for a (not shown) connection of the line 32 in FIG. 1.

Further, FIGS. 5 and 7 show that the pressure on the discharge side of the high pressure pump 16 is connected via a passage 110, valve 38 and passage 116 to the pressure chamber 94 of the second low pressure pump 14; and that the outlet passage 116 intersects passage 113 which communicates (through means not shown) with the pressure side of the pump 12 via a one-way valve 24 (not shown, but see FIG. 1).

Figure 8:
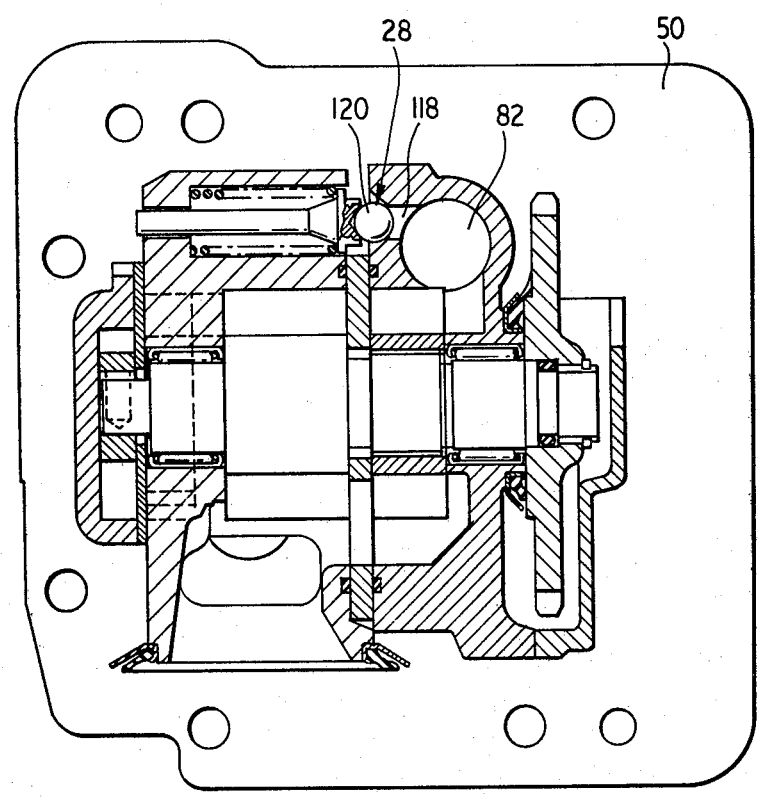
FIG. 8 is a section through the pump set, taken on the line VIII—VIII in FIG. 7.

Finally, as can be seen in FIG. 8, from the pressure chamber 82 of the first low pressure pump 12, a bore 118 extends into the open air and is normally closed by a spring-loaded ball 120 which constitutes the pressure limiting valve 28 shown in FIG. 1.

Thus, the pump unit shown in FIGS. 2 to 8 combines all the elements situated within the dash-dotted frame 10 in FIG. 1.

FIG. 9 shows the pump unit in the assembled state, in the bottom part of the housing 122 of a hydrodynamic-mechanical transmission, the (not shown) converter housing of which drives the pinion 72 through an intermediate gearwheel 124. The baseplate 50 closes off a lead-in aperture of the housing and is bolted thereto by screws 126, 128.

The bottom of the transmission housing 122 consists of a heat exchanger 130 which discharges at 132 into a suction chamber 134, against the upper aperture of which the suction connector 76 is applied. The suction chamber 134 communicates with the interior of the transmission housing 122 which is filled with oil to such a level that under all operating conditions, the two low pressure pumps are capable of drawing oil from this sump.

From the foregoing it will be appreciated that the pump arrangement of the invention comprises 3 sections of which 2 are continuously delivering pressure fluid of low and high pressure respectively, one for circulating of the fluid through the torque converter and the other to feed servo-motors in the gear system. The third pump unit is arranged also to be driven continuously but is arranged either to feed its fluid into the pressure side of the low pressure pump when high quantity is wanted or to circulate its fluid. The continuously working low pressure pump shall have a capacity decided by the demand of the torque converter in gear ratios e.g. above n2:n1=0.2. The pump is arranged for alternative functions and has a capacity equal to the low pressure pump or up to three times thereof depending on the type of application, and the high pressure pump has a capacity sufficient to maintain the desired oil pressure in the servo motor system which may be between 1/5 and 1/10 of the capacity of the first low pressure pump. The circulation of fluid delivered by the second low pressure pump, is according to the invention achieved in a way which leads to a minimum of losses simultaneously as a very quick change can be made between by-passing the fluid and delivering the fluid.

We claim:

1. A system for providing pressurized fluid comprising a first pump an a second pump, said first pump having means for supplying pressurized fluid continuously, said second pump connected to the discharge side of the first pump via a non-return valve when the outlet pressure of the second pump exceeds by a predetermined amount the outlet pressure of the first pump, a by-pass connecting channel from the outlet side of the second pump to the inlet side of the second pump, and a selectively operable shut-off valve in said by-pass connecting channel arranged such that when the shut-off valve of the by-pass connecting channel is open, fluid from the second pump does not supply fluid to the outlet of the first pump, said by-pass channel and the maximum opening of the shut-off valve each having a flow cross-sectional area at least as great as the delivery flow cross-sectional area of the second pump, said shut-off valve being a disc valve which closes upon movement toward the inlet of the second pump, and a control device for controlling the opening of the shut-off valve independently of the pressure in the first and second pumps.

2. A system according to claim 1, including means for controlling the shut-off valve so that it opens against the force of a closing spring.

3. A system according to claim 2, including a servo-motor for actuating the said shut-off valve.

4. A system according to claim 3, said control device being an electromagnetic valve for controlling the servomotor.

5. A system according to claim 1, including an auxiliary high pressure pump having an outlet pressure greater than the first and second pumps, the inlet side of the high pressure pump being connected to the discharge side of the second pump.

6. A system according to claim 5, including a pressure limiting valve connecting the outlet of the high pressure pump to the outlet side of the second low pressure fluid pump.

7. A system according to claim 1, wherein the non-return valve is a disc valve.

8. A transmission comprising:
a hydrodynamic torque converter and a mechanical change-speed gear box downstream therefrom connected to the turbine shaft of the torque converter, said change-speed gear box having servomotors for selectively engaging the brakes and/or clutches therein to select different change speed ratios,
and a fluid system for supplying pressurized fluid to the transmission comprising a first pump which operates continuously for supplying pressurized fluid to the working chamber of the torque converter, and a second pump, said second pump connected to the discharge side of the first pump via a one-way valve when the outlet side of the second pump exceeds by a predetermined amount the outlet pressure of the first pump, and a by-pass connecting channel from the outlet side of the second pump to the inlet side thereof, and a selectively openable shut-off valve in said by-pass connecting channel arranged such that when the shut-off valve of the by-pass connecting channel is open, fluid from the second pump does not supply fluid to the outlet side of the first pump, said by-pass channel and the maximum opening of the shut-off valve each having a flow cross-sectional area at least as great as the delivery flow cross-sectional area of the second pump, said shut-off valve being a disc valve which closes upon movement toward the inlet of the second pump, and a control device for controlling the opening of the shut-off valve independently of the pressure in the first and second pumps.

9. A transmission according to claim 8, said pressure system including a high pressure pump which receives fluid from the outlet side of the second pump and delivers its pressurized fluid to the said servomotors to selectively increase the pressure therein.

10. A transmission according to claim 9, including a pressure limiting valve connecting the outlet side of the high pressure pump to the discharge side of the second pump for controlling the level of pressure in the high pressure pump.

11. A transmission according to claim 8, including a plurality of axially movable valves for controlling the flow of fluid from the said pumps to the servomotors, and including electromagnetic means for controlling the said axially movable valves, and means for connecting the outlet of the first pump to control movement of the axially movable valves under the control of the said electromagnetic means.

12. A transmission according to claim 8, said first and second pumps being gear pumps located side by side with the driving gears of each of said gear pumps being coaxial and connected to a common driving means, said driving means being driven by the turbine shaft of the torque converter.

13. A transmission according to claim 12, the inlet side of both said first and second pumps being connected to receive fluid from a sump within the said transmission.

14. A transmission according to claim 12, including a high pressure pump having its inlet side connected to the outlet side of the second pump, said high pressure pump being a gear pump located in the same housing with said first and second low pressure pumps with its drive gear coaxial with and driven from the same source as the drive gears of the first and second pumps.

15. A system for providing pressurized fluid comprising a first pump and a second pump, said first pump having means for supplying pressurized fluid continuously, said second pump connected to the discharge side of the first pump via a non-return valve when the outlet pressure of the second pump exceeds by a predetermined amount the outlet pressure of the first pump, a by-pass connecting channel from the outlet side of the second pump to the inlet side of the second pump, and a selectively operable shut-off valve in said by-pass connecting channel arranged such that when the shut-off valve of the by-pass connecting channel is open, fluid from the second pump does not supply fluid to the outlet of the first pump, an auxiliary high pressure pump having an outlet pressure greater than the first and second pumps, the inlet side of the high pressure pump being connected to the discharge side of the second pump, a first one-way valve permitting fluid flow from the outlet of the high pressure pump to the outlet side of the second pump at a predetermined pressure difference, and a second one-way valve permitting fluid flow from the outlet of the first pump to the outlet of the high pressure pump below a predetermined pressure difference.

16. A system according to claim 15, including a control device in the form of an electromagnetic valve for controlling the opening of said shut-off valve independently of the pressure in the first and second pump.

17. A system according to claim 15 or claim 16, wherein the said shut-off valve is a disc type valve which closes in the direction of flow from the outlet to the inlet of the second pump.

18. A transmission comprising:
a hydrodynamic torque converter and a mechanical change-speed gear box downstream therefrom connected to the turbine shaft of the torque converter, said change-speed gear box having servomotors for selectively engaging the brakes and/or clutches therein to select different change speed ratios,
and a fluid system for supplying pressurized fluid to the transmission comprising a first pump which operates continuously for supplying pressurized fluid to the working chamber of the torque converter, and a second pump, said second pump connected to the discharge side fo the first pump via a one-way valve when the outlet side of the second pump exceeds by a predetermined amount the outlet pressure of the first pump, and a by-pass connecting channel from the outlet side of the second pump to the inlet side thereof, and a selectively openable shut-off valve in said by-pass connecting channel arranged such that when the shut-off valve of the by-pass connecting channel is open, fluid from the second pump does not supply fluid to the outlet side of the first pump, an auxiliary high pressure pump having an outlet pressure greater than the first and second pumps, the inlet side of the high pressure pump being connected to the discharge side of the second pump, a first one-way valve permitting fluid flow from the outlet of the high pressure pump to the outlet side of the second pump at a predetermined pressure difference, and a second one-way valve permitting fluid flow from the outlet of the first pump to the outlet of the high pressure pump below a predetermined pressure difference, wherein fluid flows to the said servomotors initially from the second pump, and thereafter the high pressure pump delivers its pressurized fluid to said servo-motors to selectively increase the pressure therein.

19. A transmission according to claim 18, including a control device in the form of an electromagnetic valve for controlling the opening of said shut-off valve independently of the pressure in the first and second pump.

20. A transmission according to claim 18 or claim 19, including a plurality of axially movable valves for controlling the flow of fluid from the said pumps to the servomotors, and including electromagnetic means for controlling the said axially movable valves, and means for connecting the outlet of the first pump to control movement of the axially movable valves under the control of the said electromagnetic means.

21. A transmission according to claim 18 or claim 19, said first and second pumps being gear pumps located side by side with the driving gears of each of said gear pumps being coaxial and connected to a common driving means, said driving means being driven by the turbine shaft of the torque converter.

22. A transmission according to claim 21, the inlet side of both said first and second pumps being connected to receive fluid from a sump within said transmission.

23. A transmission according to claim 21, including a high pressure pump having its inlet side connected to the outlet side of the second pump, said high pressure pump being a gear pump located in the same housing with said first and second pumps with its drive gear coaxial with and driven from the same source as the drive gears of the first and second pumps.

24. A transmission comprising:
a hydrodynamic torque converter and a mechanical change-speed gear box downstream therefrom connected to the turbine shaft of the torque converter, said change-speed gear box having servomotors for selectively engaging the brakes and/or clutches therein to select different change speed ratios, and a fluid system for supplying pressurized fluid to the transmission comprising a first low pressure pump which operates continuously for supplying pressurized fluid to the working chamber of the torque converter and to the servomotors of the change-speed gear, and a second low pressure pump, said second low pressure pump connected to the discharge side of the first low pressure pump via a non-return valve when the outlet side of the second low pressure pump exceeds the outlet pressure of the first low pressure pump, and a by-pass connecting channel from the outlet side of the second low pressure pump to the inlet side thereof, and a selectively openable shut-off valve in said by-pass connecting channel arranged such that when the shut-off valve of the by-pass connecting channel is open, fluid from the second low pressure pump does not supply fluid to the outlet side of the first low pressure pump, said first and second low pressure pumps being gear pumps located side by side with the driving gears of each of said gear pumps being coaxial and connected to a common driving means, said driving means being driven by the turbine shaft of the torque converter, and including a high pressure pump having its inlet side connected to the outlet side of the second low pressure pump, said high pressure pump being a gear pump located in the same housing with said first and second low pressure pumps with its drive gear coaxial with and driven from the same source as the drive gears of the first and second low pressure pumps.

25. A multi-chamber gear pump comprising:
first, second and third gear pumps in a common housing,
a common inlet connection to said first and second gear pumps, the outlet of the second gear pump being directly connected to the inlet side of the third pump, and said third gear pump being a higher pressure pump than the first two gear pumps,
each of the first, second and third gear pumps having a drive gear, and all three drive gears being coaxial and driven from the same drive shaft.

26. A multi-chamber gear pump according to claim 25, each of said first and third gear pumps having an outlet conduit for directly supplying the fluid from the first and third pumps to the exterior of the multi-chamber gear pump, each of said conduits further connected via one-way valves to the outlet chamber of the second gear pump.

27. A multi-chamber gear pump according to claim 26, including a one-way valve connecting together the said outlet conduits of the first and third gear pumps.

28. A multi-chamber gear pump according to any one of claims 25, 26 or 27, including a base member adjacent the three gear pumps and extending essentially parallel to the common drive gear axis and including a by-pass passage and a by-pass valve in the base member for controlling a by-pass of fluid from the second pump outlet back to the second pump inlet.

29. A transmission comprising:
a hydrodynamic torque converter and a mechanical change-speed gear box downstream therefrom connected to the turbine shaft of the torque converter, said change-speed gear box having servomotors for selectively engaging the brakes and/or clutches therein to select different change speed ratios, and a fluid system for supplying pressurized fluid to the transmission comprising a first pump which operates continuously for supplying pressurized fluid to the working chamber of the torque converter, and a second pump, said second pump connected to the discharge side of the first pump via a one-way valve when the outlet side of the second pump exceeds by a predetermined amount the outlet pressure of the first pump, and a by-pass connecting chamber from the outlet side of the second pump to the inlet side thereof, and a selectively openable shutoff valve in said by-pass connecting channel arranged such that when the shut-off valve of the by-pass connecting channel is open, fluid from the second pump does not supply fluid to the outlet side of the first pump, and a control device for controlling the opening of the shut-off valve independently of the pressure in the first and second pumps, said first and second pumps being gear pumps located side by side with the driving gears of each of said gear pumps being coaxial and connected to a common driving means, said driving means being driven by the turbine shaft of the torque converter.

30. A transmission according to claim 29, the inlet side of both said first and second pumps being connected to receive fluid from a sump within said transmission.

* * * * *